US012668127B2

(12) United States Patent
    Le Toumelin

(10) Patent No.: US 12,668,127 B2
(45) Date of Patent: Jun. 30, 2026

(54) REFLECTION DEVICE, REFLECTION ELEMENT ASSEMBLY, HEAD-UP DISPLAY AND MOTOR VEHICLE

(71) Applicant: Valeo Schalter und Sensoren GmbH, Bietigheim-Bissingen (DE)

(72) Inventor: Loic Le Toumelin, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 210 days.

(21) Appl. No.: 18/265,553

(22) PCT Filed: Nov. 30, 2021

(86) PCT No.: PCT/EP2021/083473
    § 371 (c)(1),
    (2) Date: Jun. 6, 2023

(87) PCT Pub. No.: WO2022/122461
    PCT Pub. Date: Jun. 16, 2022

(65) Prior Publication Data
    US 2024/0075813 A1     Mar. 7, 2024

(30) Foreign Application Priority Data
    Dec. 8, 2020     (DE) ..................... 10 2020 132 549.5

(51) Int. Cl.
    *B60K 35/23*        (2024.01)
    *G02B 27/01*        (2006.01)
(52) U.S. Cl.
    CPC .......... *B60K 35/23* (2024.01); *G02B 27/0149* (2013.01); *B60K 2360/23* (2024.01); *B60K 2360/691* (2024.01)

(58) Field of Classification Search
    CPC ................ G02B 27/0149; B60K 35/23; B60K 2360/691; B60K 2360/23; B60K 35/00
    See application file for complete search history.

(56) References Cited

U.S. PATENT DOCUMENTS 9,715,110 B1 * 7/2017 Brown ............... G02B 27/0081
10,067,345 B2 * 9/2018 Ushida ............... G02B 27/0149
    (Continued)

FOREIGN PATENT DOCUMENTS

CN        204360014 U       5/2015
CN        204360015 U   *   5/2015
    (Continued)

OTHER PUBLICATIONS

Arestech car mobile HUD holder with HD image reflector sold on amazon.com https://www.amazon.com/Arestech-Display-Reflection-Smartphone-Navigation/dp/B01M3OZSBT?th=1 (Year: 2016).*
    (Continued)

*Primary Examiner* — Terrell L McKinnon
*Assistant Examiner* — Ding Y Tan
(74) *Attorney, Agent, or Firm* — Osha Bergman Watanabe & Burton LLP

(57)        ABSTRACT

A reflection device for a head-up display, a reflection element assembly, a head-up display and a motor vehicle are disclosed. The reflection device is configured for reflecting of radiation emitted by an image generation unit and includes a reflection element having a reflection side and a back side being arranged on the side remote from the reflection side, and a carrier supporting the reflection element. The reflection element is movably coupled to the carrier by at least one bearing such that the reflection element is pivotable relatively to the carrier about at least a first axis. The carrier is being couplable to a housing of a head-up display, or directly to a vehicle body, and wherein
    (Continued)

Figures 1, 2:
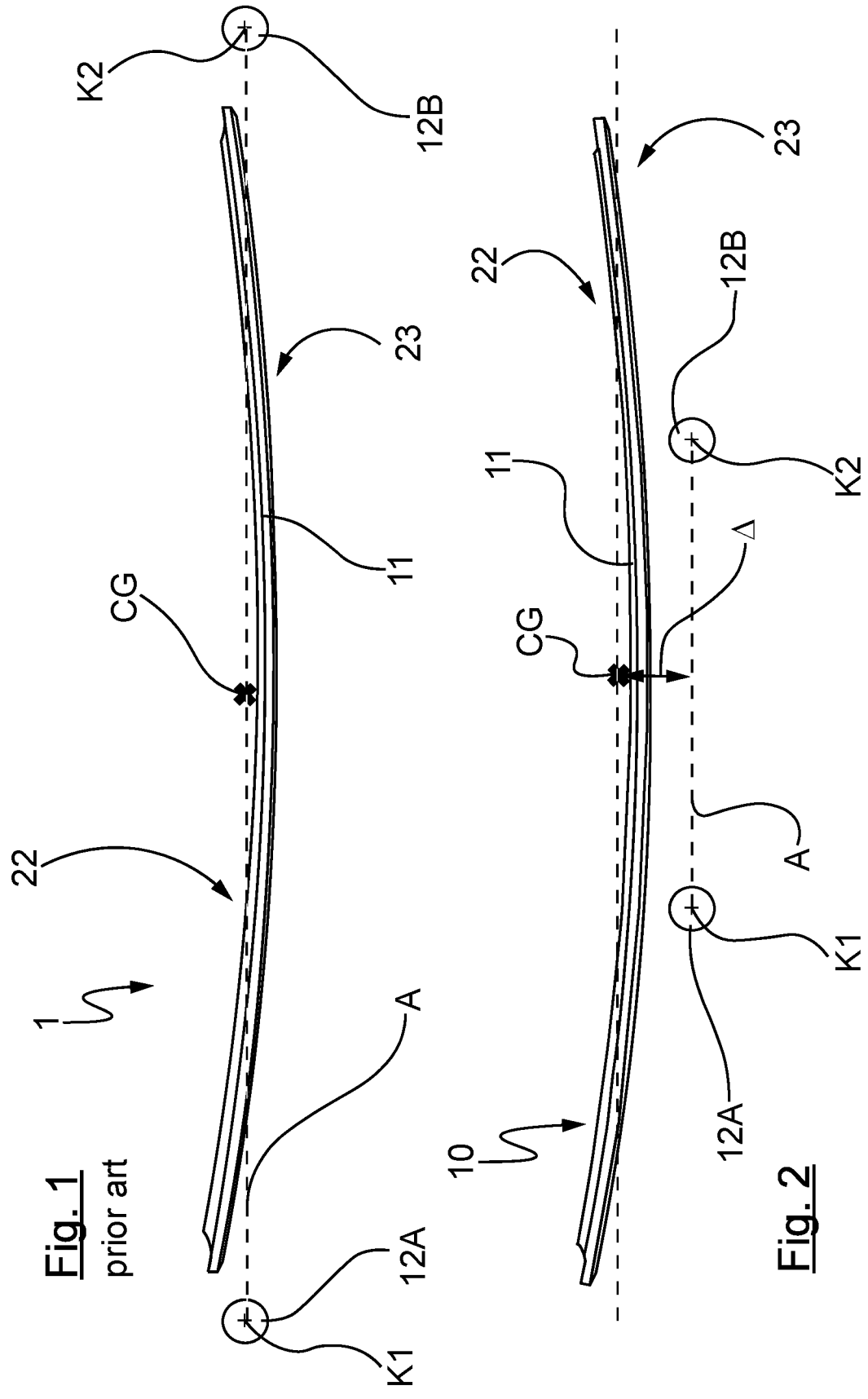

the at least one bearing is arranged at the back side of the reflection element such that the first axis is extending completely behind the back side of the reflection element.

11 Claims, 9 Drawing Sheets

(56)                    References Cited

U.S. PATENT DOCUMENTS

| | | | | |
|---|---|---|---|---|
| 11,474,353 | B2 * | 10/2022 | Uto ........................ | G02B 7/1821 |
| 2017/0168299 | A1 * | 6/2017 | Lambert .............. | B60K 35/232 |
| 2017/0336632 | A1 * | 11/2017 | Ushida ...................... | H04N 5/74 |
| 2017/0371158 | A1 * | 12/2017 | Tang-Kong .............. | G02B 5/10 |
| 2018/0356632 | A1 | 12/2018 | Furuya et al. | |
| 2019/0129172 | A1 * | 5/2019 | Misawa ............... | H05K 7/2039 |
| 2019/0219823 | A1 * | 7/2019 | Henon ................. | G02B 27/646 |
| 2019/0278053 | A1 * | 9/2019 | Takahashi .............. | B60K 35/23 |
| 2020/0116998 | A1 * | 4/2020 | Chen .................. | G02B 27/0101 |
| 2020/0233216 | A1 * | 7/2020 | Liesener ................ | B60K 35/53 |
| 2020/0271930 | A1 * | 8/2020 | Hatasako ............ | F16H 25/2006 |
| 2020/0363637 | A1 * | 11/2020 | Uto ........................ | B60K 35/00 |
| 2021/0132332 | A1 * | 5/2021 | Fujimoto .............. | B60K 35/53 |
| 2022/0111729 | A1 * | 4/2022 | Shin ......................... | G02B 5/10 |

FOREIGN PATENT DOCUMENTS

| | | | | | |
|---|---|---|---|---|---|
| CN | 109416473 | A | * | 3/2019 | ............. B60K 35/00 |
| DE | 202015107040 | U1 | | 3/2016 | |
| DE | 112018005208 | T5 | | 6/2020 | |
| EP | 3677948 | A1 | | 7/2020 | |
| FR | 3023926 | A1 | | 1/2016 | |
| JP | 2015102700 | A | | 6/2015 | |
| JP | 2017203881 | A | | 11/2017 | |
| JP | 2017207551 | A | * | 11/2017 | |
| JP | 2018192962 | A | | 12/2018 | |
| JP | 2020046567 | A | * | 3/2020 | ............. B60K 35/28 |
| WO | WO-2016093163 | A1 | * | 6/2016 | ............. B60K 35/00 |
| WO | 2016186034 | A1 | | 11/2016 | |
| WO | WO-2016189361 | A1 | * | 12/2016 | ........ G02B 27/0149 |
| WO | 2019082954 | A1 | | 5/2019 | |
| WO | WO-2020059206 | A1 | * | 3/2020 | ............. B60K 35/28 |
| WO | WO-2020196163 | A1 | * | 10/2020 | ............. B60K 35/23 |

OTHER PUBLICATIONS

International Search Report and Written Opinion in corresponding International Application No. PCT/EP2021/083473, dated May 24, 2022 (12 pages).

German Search Report in corresponding German Application No. 10 2020 132 549.5, dated Jul. 16, 2021 (6 pages).

Office Action issued by the Chinese Patent Office for corresponding Chinese Patent Application No. 2021800821938, mailed Jul. 20, 2025 (60 pages).

* cited by examiner

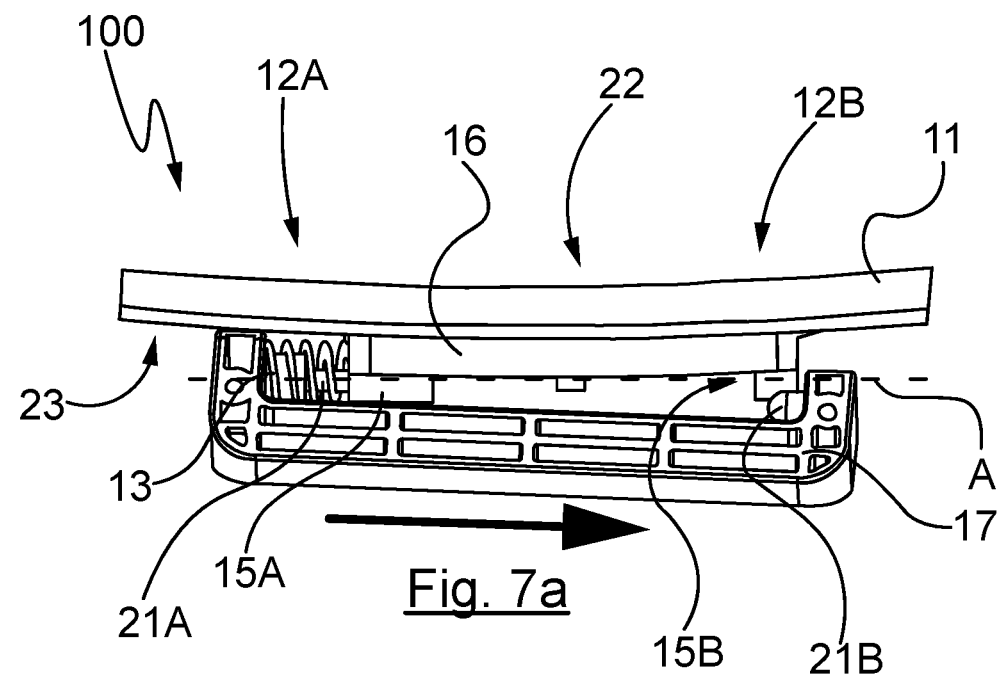
_Fig. 7a_
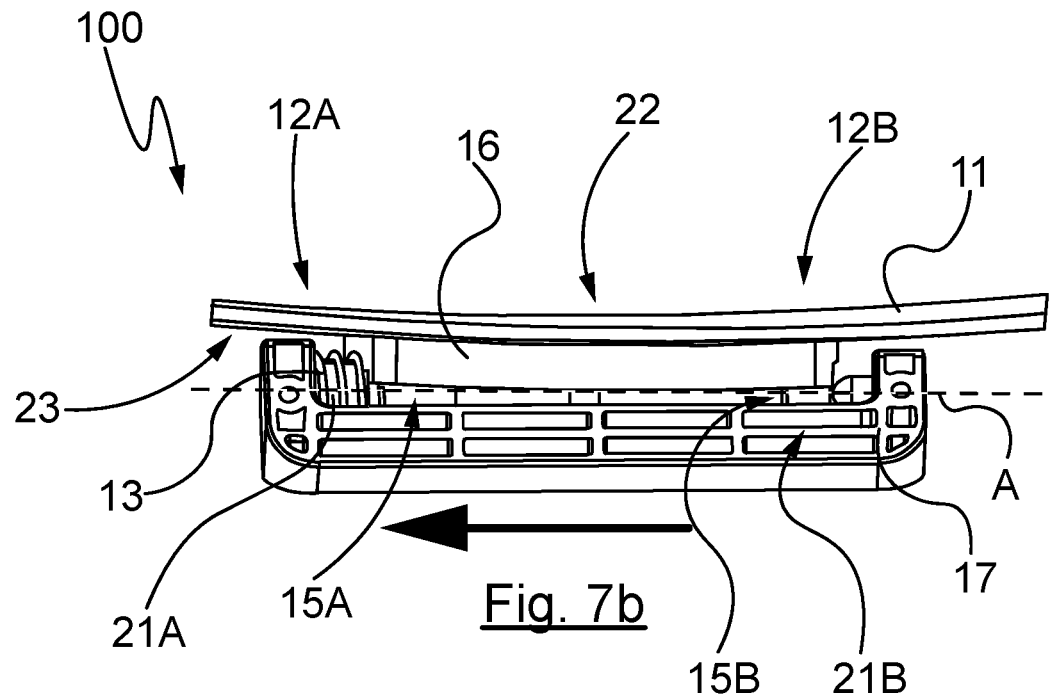
_Fig. 7b_

REFLECTION DEVICE, REFLECTION ELEMENT ASSEMBLY, HEAD-UP DISPLAY AND MOTOR VEHICLE

The present invention relates to a reflection device, in particular a mirror device, for a head-up display, in particular for a windshield head-up display, for reflecting of radiation emitted by an image generation unit, wherein the reflection device comprises a reflection element having a reflection side and a back side being arranged on the side remote from the reflection side; and a carrier supporting the reflection element, wherein the reflection element is movably coupled to the carrier by at least one bearing such that the reflection element is pivotable relatively to the carrier about at least a first axis, and wherein the carrier is couplable to a housing, preferably to a housing of a head-up display, or directly to a vehicle body.

The present invention further relates to a reflection element assembly for a reflection device of a head-up display, comprising a reflection element having a reflection side and a back side being arranged on the side remote from the reflection side, and further comprises at least one bearing part of an at least two-part bearing, wherein the reflection element is pivotably couplable to a carrier by at least one bearing comprising at least two bearing parts such that the reflection element is pivotable relatively to the carrier about at least a first axis, wherein the carrier supports the reflection element and is couplable to a housing, in particular a housing of a head-up display, or directly to a vehicle body.

The present invention further relates to a head-up display, in particular for a motor vehicle, comprising an image generation unit for emitting light beams to produce an image and comprising at least one reflection device for reflecting the light beams emitted by the image generation unit.

Furthermore, the present invention relates to a motor vehicle having a head-up display.

Reflection devices for head-up displays and head-up displays in general, especially for motor vehicles, are well known in the art. Head-up displays usually comprise an image generation unit that generates an image and a reflection device for projecting this image, for example, to a combiner as a kind of a screen or directly onto the windshield of the motor vehicle, wherein the image is preferably projected into the viewing direction of a driver of the motor vehicle, in particular such that the driver can see the projected image when looking at the combiner or the windscreen without moving his head and/or without changing viewing direction.

Due to the different size and different proportions of different drivers, it is advantageous if the position of the projection can be changed in such a way that the projection can be adapted to different drivers or drivers of different sizes. For this purpose, head-up displays often comprise a mirror arranged in a beam path or in an optical path of the image generation unit which is movable, in particular pivotable for being tilted, may be adjustable by an actuator device, in order to adapt the position of the projected image, in particular to adapt the position of the projected image into a so called "eyebox" of a driver.

In general, head-up displays with movable, in particular pivotable mirrors are known from prior art, for example from US 2017/0168299 A1, JP 2018-192962A, FR 3 023 926 and WO 2016/186034 A1, wherein several different designs are known.

For projecting images of high quality, in particular for projecting sharp and clear images, onto the combiner or the windshield and therewith into the driver's field of view the support of the reflection element respective of the mirror is crucial.

With respect to noise, vibration, harness and kinematics field it is a best to have the center of gravity of rotation parts of the mirror close to or on the axis of rotation of the mirror. In prior art reflection devices the connection interfaces of the pivot axis or the axis of rotation to a surrounding housing is very often arranged laterally outside of the reflection element to ease the assembly of the mirror with its usually concave shape.

However, connection interfaces arranged laterally outside of the mirror are usually visible from the optical chamber. So to avoid them to be visible, the optical chamber has to be adapted by suitable measures. Further, the arrangement of the connection interfaces on the side of the mirror requires some additional package respectively space for integration in a motor vehicle.

Against this background, it is one object of the present invention to provide an alternative reflection device, preferably a reflection device with an improved support of the reflection element, in particular with an improved arrangement and/or an improved design of the support of the reflection element, in particular without or with almost no negative impact on vibration behaviour of the reflection element.

Further it is an object of the present invention to provide an alternative reflection element assembly and an alternative head-up display comprising a reflection device, preferably an improved head-up display. Also, it is an object of the present invention to provide an alternative motor vehicle comprising a head-up display, preferably an improved motor vehicle.

These objects are achieved by a reflection device, by a reflection element assembly, by a head-up display and by a motor vehicle with the features according to the respective independent claims. Advantageous embodiments of the invention are the subject of the dependent claims, the description, and the figures.

A reflection device according to the present invention is in particular a mirror device, wherein the reflection device is designed for use in head-up display, in particular for use in a windshield head-up display, and is configured to reflect radiation emitted by an image generation unit, wherein the reflection device comprises a reflection element having a reflection side and a back side being arranged on the side remote from the reflection side; and a carrier supporting the reflection element, wherein the reflection element is movably coupled to the carrier by at least one bearing such that the reflection element is pivotable relatively to the carrier about at least a first axis, and wherein the carrier is couplable to a housing, preferably to a housing of a head-up display, or directly to a vehicle body.

A reflection device according to the invention, is characterized in that the at least one bearing is arranged at the back side of the reflection element such that the first axis is extending completely behind the back side of the reflection element.

This arrangement with the at least one bearing is arranged at the back side of the reflection element such that the first axis is extending completely behind the back side of the reflection element allows to provide a reflection device with a smaller dimension in lateral direction requiring less package in a motor vehicle in this direction, in particular without or with almost no or with easy to deal with negative impact on the vibration behaviour.

Furthermore, a reflection device can be provided without connection interfaces or bearings being visible in the optical chamber. Therefore, the optical chamber can spouse perfectly the mirror's shape without discontinuity in its design or any local design-deviation.

With the arrangement of the first axis completely on the back side of the reflection element, i.e. with a first axis which does not (virtually) pierces or penetrates the reflection element, also a small lever from the center of gravity of the reflection element to the first axis can be achieved. This is advantageous regarding the vibration behaviour of the reflection element and results in good vibration behaviour, too.

A "reflection element" according to the present invention is an element, in particular a part or a group of parts being assembled, which is configured to reflect and/or influence radiation, for example changing direction, in particular of light or one or more light beams, respectively, and therefore in particular of one or more parts of an image or of a whole image.

A "carrier" according to the invention is preferably a supporting structure. A carrier in the meaning of the present invention can be coupled to a housing or may be mounted to a housing, in particular to a housing of head-up display. Alternatively, the carrier may be formed by a housing or by a part of a housing, for example by the housing of a head-up display. As a consequence, a reflection element of a reflection device according to the present invention or of a reflection element assembly may for example be coupled to a housing of a head-up display directly, wherein the housing is the "carrier", or via a separate receiving or supporting structure, wherein in this case the separate receiving or supporting structure is the "carrier".

According to the present invention the "reflection side" of the reflection element is that side of the reflection element, in particular that surface of the reflection element, which is configured to reflect and/or influence the radiation.

In a preferred embodiment of the present invention the reflection device is adapted and configured to reflect or optically influence an image created by an image generation unit, wherein the image may for example contain one or more navigation information, a vehicle velocity information or any other information which might be an interesting information for a driver of a vehicle as it is known from prior art.

The reflection device may be adapted and configured for use in a head-up display comprising in a combiner, wherein the reflection device is configured to project an image to the combiner. In addition or alternatively, the reflection device may be adapted and configured for use in a windshield head-up display, wherein the reflection device is configured to project an image to the windshield.

Both kinds of head-up displays, head-up displays with combiner and windshield head-up displays, are in general well known from prior art to which is referred herewith for further details regarding general design and/or functionality aspects of such head-up displays.

In a preferred embodiment of a reflection device according to the present invention, the first axis is a horizontal axis, based on a state of use of the reflection device. By a first axis being aligned horizontal, the reflection element may be tilted for aligning the reflection element to a windshield of a motor vehicle for example, in particular to the windshield's inclination.

In a preferred embodiment of a reflection device according to the present invention the reflection element is preferably a mirror element, in particular a concave mirror element having a concave reflection side. For minimum weight and minimum space requirements the reflection element is preferably shaped as a thin shield.

Additionally, the reflection side only or the whole reflection element may also be curved, wherein in particular the curvature is corresponding to the curvature of the windshield of the vehicle the reflection device is intended for. The reflection element may in particular be a so-called "free-form" reflection element having a non-constant radius concave shape. The reflection element may in particular be configured as a magnifying mirror.

In a very advantageous embodiment of a reflection device according to the present invention the first axis is in particular aligned parallel to an optical main axis of the reflection element.

Preferably, the outer edge of the reflection element is substantially rectangular such that the reflection element in particular has a substantially rectangular outer contour. Alternatively, the outer edge may have a different shape, for example a trapezoidal or oval or elliptical shape or shape of a parallelepiped.

In an advantageous embodiment of a reflection device according to the present invention the reflection element contains glass or is made of glass. A reflection element made of glass, a glass mirror for example, has the benefit of having better optical quality and of being more stable over temperature's range compared to a reflection element made of plastic. Furthermore, by using glass as reflection element material smaller mirror thickness can be realized.

However, in some cases an alternative configuration of the reflection device comprising a reflection element made at least partly or completely of plastic may be more advantageous, for example if a lower image projecting quality is sufficient or if a target weight of the reflection device cannot be achieved with a reflection element made of glass.

The reflection element may comprise a coating, in particular a reflection coating, may be a coating of metal or a coating containing metal. Thereby, advantageous reflecting and/or projecting properties can be achieved.

In an advantageous embodiment of a reflection device according to the present invention the reflection side of the reflection element may be a uniform or smooth surface, that means a surface, which is free of any protrusion and/or deepening. Thereby, advantageous reflecting and/or projecting properties can be achieved.

In an advantageous embodiment of a reflection device according to the present invention additionally or alternatively the back side of the reflection element may be a uniform or smooth surface. Thereby, the reflection element can be produced easily. In particular no working steps for creating any protrusion or deepening are necessary.

In an advantageous embodiment of a reflection device according to the present invention by which the inventive arrangement of the first axis completely behind respectively on the back side of the reflection can be realised in a very easy manner, the reflection element comprises an outer edge surrounding the reflection element and at least one bearing arranged at the back side of the reflection element such that a kinematic point of said bearing is located within the area of the back side being surrounded by the outer edge of said reflection element.

A "kinematic point of a bearing" according to the present invention is that point of the bearing to which real movement in the bearing can be reduced or idealized with sufficient accuracy, for example for simulation purposes.

In an preferred embodiment of a reflection device according to the present invention at least one bearing is arranged at the back side of the reflection element such that a kinematic point of said bearing is located within a center area of the back side or near a center point of the back side or at the center of the back side.

The "center point of the back side" according to the present invention is preferably the geometrical center of the area of the back side of the reflection element. The "center area" is preferably an area being limited by a closed line in circumferential direction around the center point on a back side surface along a respective half or third distance from the center point to the outer edge for the respective corresponding directions.

In an further advantageous embodiment of a reflection device according to the present invention the reflection element is rotatably coupled to the carrier by at least two bearings, in particular a first bearing and a second bearing arranged at the back side of the reflection element with each bearing having a kinematic point and the kinematic points of said bearings defining the first axis about which the reflection element is rotatable relatively to the carrier. In a preferred embodiment, said two bearings are arranged at the back side of the reflection element such that their kinematic points are located within the outer edge. Thereby, in an easy manner a stable and stiff coupling of the reflection element to the carrier can be achieved. Further, a very easy to design and very easy to assemble reflection device can be provided.

In an further advantageous embodiment of a reflection device according to the present invention at least one bearing comprises at least two parts: a bearing pivot and a bearing receptacle for receiving said bearing pivot; wherein one of said parts, the bearing pivot or the bearing receptacle, is mounted fixedly to the reflection element and the other one, bearing receptacle or the bearing pivot, respectively, is mounted fixedly to the carrier. This allows providing a very simple reflection device which can be produced and assembled very easily.

The bearing receptacle and/or the bearing pivot may be made of plastic or any other material. However, due to weight reasons, the bearing receptacle and/or the bearing pivot are preferably made of plastic, in particular of plastic material having high rigidity as for example polyamide.

In a further advantageous embodiment of a reflection device according to the present invention at least one bearing receptacle is fixedly mounted to the reflection element, in particular via a support structure. In case of more than one bearing, e.g. in case of two bearings, preferably all, e.g. both, bearing receptacles (first and second) are fixedly mounted to the reflection element, in particular via a support structure, preferably via the same support structure.

In an advantageous embodiment of a reflection device according to the present invention the support structure in particular may be formed as a shield or a shield-shaped frame, wherein the support structure preferably comprises a mounting side and a back side. The support structure in particular may be formed and arranged such that its mounting side is facing the back side of the reflection element and extends at least partly parallel to the reflection element, in particular to its reflection side and/or its back side. This allows a very compact design of the reflection device. Thus, a reflection device can be provided, which has only a small space requirement.

In an advantageous embodiment of a reflection device according to the present invention the support structure preferably may also have a concave shape and may additionally also be curved, wherein in particular the support structure has a curvature corresponding to the curvature of the back side of the reflection element. This allows a very compact design of the reflection device. Thus, a reflection device can be provided, which has only a small space requirement.

Preferably, the support structure contains plastic or is made of plastic, in particular of plastic material having a high rigidity, wherein the support structure preferably is made of polyamide. Thereby, a more lightweight design can be realized. Due to the bearing arrangement according to the invention also with a support structure containing plastic or being made of plastic sufficient rigidity of the reflection element support can be achieved.

In an advantageous embodiment of a reflection device according to the present invention the support structure comprises a lightweight design, wherein the support structure in particular comprises reinforcing ribs and/or at least partly a timbered structure or a honeycomb structure. Thereby, an advantageous ratio of rigidity to weight can be achieved.

In an advantageous embodiment of a reflection device according to the present invention the support structure is fixedly mounted by fastening means, in particular by glue or by adhesive tape, in particular to the reflection element, wherein the support structure is preferably fixedly mounted to the back side of the reflection element by a glue or an adhesive pad.

Additionally or alternatively, the support structure can be fixedly mounted for example by a latching mechanism, a clamping mechanism, by screwing or a combination thereof.

For a high rigidity of the reflection device, in particular for a high rigidity of the coupling between the support structure and the reflection element, in case the fastening means are or comprise adhesive, the adhesive layer thickness is as low as possible. However, by a thicker adhesive layer different thermal expansion of the reflection element and the support structure can be better compensated.

By using glue instead of adhesive tape during assembly of the reflection device tolerances between the reflection element and the carrier, in particular deviations in geometry and/or position relatively to each other, can be better compensated.

In an advantageous embodiment of a reflection device according to the present invention at least one bearing receptacle is integrally formed with the part it is fixedly mounted to, wherein at least one bearing receptacle is in particular integrally formed with the support structure, preferably integrally moulded.

In an advantageous embodiment of a reflection device according to the present invention the bearing pivot is integrally formed with the part it is mounted to, wherein the bearing pivot is preferably integrally formed with the carrier, preferably integrally moulded, wherein the carrier is preferably made of plastic. This allows providing a carrier, which can be manufactured very easy and which can be adapted flexibly in its design to the respective requirements. Furthermore, a very light carrier can be achieved thereby. When using injection moulding or a similar method for generating said carrier, very easy measures for increasing stiffness of the carrier can be realized, for example a timbered structure design or a honeycomb structure design.

In an advantageous embodiment of a reflection device according to the present invention in case of two bearings both bearing pivots are preferably fixedly mounted to the carrier, particularly to the same carrier.

In an further advantageous embodiment of a reflection device according to the present invention one of said two bearings comprises one degree of freedom with respect to a translation in an axial direction along the first axis and enables relative movement between the bearing parts in a first axial direction along the first axis, wherein an axial movement in a second axial direction opposite to the first axial direction is limited, preferably by an end stop, in particular an axial movement of the bearing pivot within the associated bearing receptacle, wherein in particular a movement in assembling direction is limited by the end stop. This allows a very easy to assemble bearing design with an advantageous functionality.

In a further advantageous embodiment of a reflection device according to the present invention one of said two bearings, in particular the other one, comprises two degrees of freedom with respect to a translation in an axial direction along the first axis and enables relative movement between the bearing parts in a first axial direction along the first axis and in a second axial direction opposite to the first axial direction, in particular an axial movement of the bearing pivot within the associated bearing receptacle, preferably at least over a defined distance. This allows a very easy to assemble bearing design with an advantageous functionality.

In a further advantageous embodiment of a reflection device according to the present invention the reflection device comprises biasing means for generating at least a biasing force in an axial direction parallel or along the first axis in an assembled state of said reflection device, preferably for holding the reflection element in a defined position in axial direction along the first axis after assembling of the reflection device, in particular for biasing a bearing pivot to an end stop of an associated bearing receptacle having such an end stop. Thereby tolerances can be compensated in at least one bearing. Particularly, thereby a play in at least one bearing in the direction the biasing effects can be reduced or eliminated which results in improved vibration and adjustment behaviour of the reflection element and as a consequence in an improved image projection quality.

The biasing means can be configured and/or arranged as a "1 D-biasing means", i.e. as a biasing means generating a biasing force extending in only one of the spatial directions X, Y or Z. Such an 1D-baising means may for example be a coil spring arranged with its longitudinal axis parallel or along the first axis.

Alternatively, the biasing means may be a "2D- or 3D-biasing means", i.e. a biasing means generating a 2D or 3D biasing force extending in at least two, in particular in all three spatial directions X, Y and Z. Thereby a play in at least one bearing in at least two respectively in all spatial directions X, Y and Z can be reduced or eliminated which results in improved vibration and adjustment behaviour of the reflection element also in the additional biasing direction (compared to a 1D-biasing element) and as a consequence in an improved image projection quality.

In one embodiment of a reflection device according to the present invention the reflection device may comprise more than one biasing means.

In general, the biasing means may be designed, configured and/or arranged as a pressure biasing means or as a tension biasing means, depending on the design and arrangement of the reflection device, in particular depending on the at least one bearing. Dependent on the direction(s) and amount of the biasing force(s) being generated, a play in the respective direction(s) can be reduced or eliminated. Reduced play(s) result(s) in improved vibration and adjustment behaviour of the reflection element. Consequently, an improved image projection quality can be achieved.

In an further advantageous embodiment of a reflection device according to the present invention at least one bearing comprises a bearing receptacle which is designed, configured and aligned such that an assembly direction along which the bearing pivot has at least partly to be inserted into the bearing receptacle is extending at least substantially parallel or parallel to the first axis of the reflection device. This allows a very easy respectively advantageous assembly of the two bearing parts.

In a further advantageous embodiment of a reflection device according to the present invention at least one bearing preferably comprises a bearing receptacle with a longitudinal receptacle axis aligned at least substantially parallel or parallel to the first axis or which is in line with the first axis.

In a further advantageous embodiment of a reflection device according to the present invention at least one bearing receptacle is designed and configured such that a bearing pivot forming the second part of said bearing is insertable (respectively has been inserted in an assembled state of the reflection device) in an assembling direction from an outer edge of the reflection element inwards to the center point of the reflection element parallel to or along the first axis. This allows a very easy to assemble bearing design with an advantageous functionality.

In case of two bearings, preferably the bearing receptacles of said two bearings are designed such that the corresponding bearing pivots each forming a second parts of one of said bearings are each insertable (respectively has been inserted in an assembled state of the reflection device) in an assembling direction from an outer edge of the reflection element inwards to the center point of the reflection element parallel to or along the first axis resulting in opposite assembling directions for the two bearing pivots. This allows a very easy to assemble bearing design with an advantageous functionality.

Alternatively, at least one bearing can be designed such that the bearing pivot has to be inserted in an assembling direction outwards from the center point of the reflection element to an outer edge of the reflection element parallel to or along the first axis, wherein preferably in case of two bearings preferably the bearing receptacles of said two bearings are designed such that the corresponding bearing pivots each are insertable (respectively has been inserted in an assembled state of the reflection device) in an assembling direction inwards from an outer edge of the reflection element to the center point of the reflection element parallel to or along the first axis, again resulting in opposite assembling directions for the two bearing pivots. This allows a very easy to assemble bearing design with an advantageous functionality.

In a further advantageous embodiment of a reflection device according to the present invention at least one bearing comprises a bearing receptacle which is at least partly or substantially or similarly shaped as a hollow cylinder and/or as a hollow cone. This allows a very easy to assemble bearing design with an advantageous functionality.

In a preferred embodiment, at least one bearing comprises a bearing receptacle having a closed bottom side and an open top side, wherein the bearing pivot of said bearing is inserted at least partly from the open side into the bearing receptacle in an assembled state of the reflection device. In case of a at least partly hollow-cone shaped bearing receptacle, the hollow cone can particularly form the bottom side of the bearing receptacle, in particular adjacent of a hollow cylindrical or tube shaped section or similar, wherein the tip of the cone preferably faces away from the open end of the cylinder or tube section.

In an further advantageous embodiment of a reflection device according to the present invention bearing pivot has an at least partly cylindrical and/or spherical and/or hemispherical shaped outer surface or a ball sphere end or a ball sphere surface or similar as a bearing surface with which the bearing pivot contacts a or slides on a bearing surface of the bearing receptacle. This allows a very easy to assemble bearing design with an advantageous functionality, in particular with low bearing friction.

If at least one bearing part is made of plastic, the bearing may be designed as a dry bearing, that means as a bearing for which no additional lubricant is necessary. In some cases, for an adequate lubrication it may be helpful, if the material the bearing is made of or comprises lubricating particles and/or if at least one sliding zone of at least one bearing comprises a friction reduced surface, which for example may be formed by friction reduced coating.

For coupling or assembling of the two bearing parts the bearing pivot of at least one bearing may be at least partly inserted along a longitudinal axis of the hollow cylinder into the hollow cylinder from said open top side towards the bottom side, in particular without contacting the bottom side of that cylinder, since this might causes high friction in the bearing. However, if the bearing receptacle comprises a hollow cone-shaped bottom, the bearing pivot may be inserted until the bearing pivot contacts the inclined cone surfaces.

In this case, the enabled contact will just be a circular contact line resulting in low friction between bearing pivot and bearing receptacle.

Preferably, first at least one bearing pivot has to be inserted with an angle to the first axis, then be aligned with the first axis by pivoting and then be inserted by a translational movement along the first axis into the associated bearing receptacle until a final bearing coupling position in the bearing receptacle is reached, wherein in case of two bearings in particular one of the bearing pivots is inserted until an end stop is contacted.

In a further advantageous embodiment of a reflection device according to the present invention the reflection device may further comprise at least one securing element for securing the coupling between the reflection element and the carrier, in particular for securing at least one bearing pivot in the associated bearing receptacle, wherein the securing element in particular comprises an elastic element or is an elastic element and can preferably be a leaf spring or a sheet metal strip, by which in particular a clamping force can be applied. This makes the assembly of the reflection device very safe.

Instead of being elastic, the securing element may also be a rigid element, for example a rigid clamp. The securing element may also be a combination of at least one rigid element and at least one elastic element, for example a rigid clamp with an elastic pad on its inner side.

In some embodiments the securing element may be fastened to the support structure by fastening means, preferably by at least one screw and/or by at least one clamp and/or by at least one latch and/or by at least one clip. Fastening means may be latching means or a latching mechanism or clamping means or a clamping mechanism or any other locking mechanism.

In one embodiment of a reflection device according to the present invention the carrier may comprise an assembly recess extending at least partly around the bearing, in particular for fastening the securing element to the support structure. This makes the assembly of the securing element very easy and comfortable.

A reflection element assembly for a reflection device for a head-up display according to the present invention comprises a reflection element having a reflection side and a back side being arranged on the side remote from the reflection side, and further comprises at least one bearing part of an at least two-part bearing, wherein the reflection element is pivotably couplable to a carrier by at least one two-part bearing comprising at least two bearing parts such that the reflection element is pivotable relatively to the carrier about at least a first axis, wherein the carrier supports the reflection element and is couplable to a housing, in particular a housing of a head-up display, or directly to a vehicle body, wherein a reflection element assembly according to the present invention is characterized in that said at least one bearing part of said at least one bearing is arranged at the back side of the reflection element and is configured such that in a state of use of the reflection assembly the first axis is extending completely behind the back side of the reflection element.

Preferably, a reflection element assembly according to the present invention is configured for making a reflection device according to the present invention.

The at least one bearing part is in particular a bearing receptacle fixedly mounted to or integrated into a support structure, wherein the support structure is preferably mounted fixedly to the reflection element, preferably to its back side, wherein the support structure and the bearing receptacle are preferably designed as described above and are configured for being coupled to a bearing pivot forming a second part of the bearing, and wherein the support structure is preferably fastened by glue or adhesive tape to the reflection element.

In an advantageous embodiment of a reflection element assembly, the reflection element comprises at least two bearing parts fixedly mounted to the back side of the reflection element, wherein all of them are preferably bearing receptacles being fixedly mounted to or integrated into a support structure.

A head-up display, in particular for a motor vehicle, comprises an image generation unit for emitting light beams to produce an image and further comprises at least one reflection device for reflecting the light beams emitted by the image generation unit, wherein a head-up display according to the present invention is characterized in that the reflection device is designed according to the present invention.

Head-up displays are in general well known from prior art to which is referred herewith for further details regarding general design and/or functionality aspects of a head-up display according to the present invention.

The image generation unit in particular serves to generate an image, which can be perceived by a driver of the vehicle. This can be realized, for example, by emitting light radiation for displaying the image from the image generation unit. The image generation unit can be arranged in a housing of the head-up display.

A head-up display according to the present invention may comprise one or more reflection devices, wherein at least one reflection device may comprise one or more reflection elements coupled pivotably to a carrier as described above, wherein said one or more reflection elements may be coupled to a common carrier or to several different carriers, what means that a head-up display according to the invention also may comprise several carriers.

The at least one rotatably mounted reflection element serves, in particular, for deflecting the light output generated by the image generation unit and is preferably arranged directly behind the image generation unit in the beam direction of the light radiation emitted by the image generation unit. From said reflection element, the light radiation can be passed through a housing of the head-up display or through a housing opening of the head-up display in a field of view of a vehicle's driver.

The projection surface, onto which the generated image can be projected may be windshield of a vehicle, for example the windshield in front of a motor vehicle, or a separate combiner disc, which may be part of an inventive head-up display and which is preferably arranged such that it can be viewed by the person for whom the image is generated, which may be for example a driver of a motor vehicle. The projection surface may be a semi-transparent reflection surface, in particular a mirror surface.

In an advantageous embodiment of a head-up display according to the present invention, the head-up display is configured such that the generated image can be superimposed in a manner known per se with information appearing through the projection surface from an environment located behind the projection surface, thereby producing an image with additional information. In particular, a head-up display according to the invention may be a so called "augmented reality head-up display (AR head-up display)" or a so called "reality head-up display (VR head-up display)" or a combination thereof, wherein the head-up display is configured for displaying an augmented reality image or a reality image.

In order to enable a driver of a vehicle, in particular of a motor vehicle, to have a good view of the image, depending on the seating position or depending on the driver's size, a driver's field of view, which is also called "eyebox", may be tracked, in particular by the head-up display, which therefore may preferably being configured correspondingly and which may in particular comprise additional elements, for example several corresponding sensor elements and at least on control unit for determining position, orientation and/or size and/or dimension of the eyebox.

In a further advantageous embodiment of a head-up display according to the present invention, the output light reflected by the reflection device may be tracked the eyebox and as a result a driver's direction of view, what and can be realized by means of an adjusting device and/or a corresponding kinematics acting on the reflection element of the reflection device.

For adjusting the reflection element, in particular for pivoting or rotating it around the first axis, the reflection device and/or the head-up display may comprise a pivot drive unit, in particular a linear pivot drive unit, which may in particular be coupled to the reflection element, preferably via coupling means of the support structure. Preferably, the pivot drive unit is designed and configured to pivot the reflection element around the first axis by linear actuation, in particular by linear actuation orthogonal to the first axis.

A motor vehicle having a head-up display, characterized in that the head-up display is designed according to the present invention.

The preferred embodiments presented with respect to a reflection device according to the present invention and their advantages apply correspondingly to a reflection element assembly according to the present invention, to a head-up-display according to the present invention to a motor vehicle according to the present invention and vice versa.

Further features of the invention will become apparent from the claims, the figures and the description of the figures. All the features and feature combinations mentioned above in the description as well as the features and feature combinations mentioned below in the description of the figures and/or shown alone in the figures can be used not only in the respectively indicated combination but also in other combinations or alone so far, the resulting combination may be carried out.

The invention will now be described with reference to preferred but non-limiting embodiments of the present invention and with reference to the accompanying and schematic drawings, wherein it is shown in FIG. 1 a top view of a prior-art reflection assembly and its pivot kinematic, FIG. 2 a schematic illustration of a top view of a first embodiment of a reflection assembly according to the present invention with its inventive bearing arrangement and resulting pivot kinematic, FIG. 3 a schematic illustration of a first embodiment of a reflection device according to the present invention in a perspective view, FIG. 4 an exploded view of the reflection device of FIG. 3, FIG. 5 a section view along the first axis of the reflection device of FIGS. 3 and 4, FIG. 6 a principle illustration of the bearing arrangement of the bearings of the reflection device of FIGS. 3 to 5, FIGS. 7a to 7d some of the assembling steps to be processed for assembling the of the reflection device of FIGS. 3 to 6, FIG. 8 a perspective view of second embodiment of a reflection device according to the present invention with a 3D-biasing element instead of a 1 D-biasing element, and FIG. 9 a side view from the reflection device of FIG. 8.

FIG. 1 shows a top view of a prior-art reflection assembly 1 for a windshield head-up display, wherein the reflection assembly 1 comprises a curved and concave reflection element 11 having a reflection side 22 and a back side 23. The reflection element 11 is pivotable around a first axis A which is defined by the kinematic points K1 and K2 of a first bearing 12A arranged outside the left outer edge of the reflection element 11 and of a second bearing 12B arranged outside the right outer edge of the reflection element 11. The bearings 12A and 12B are arranged such that a center of gravity CG of the reflection element 11 is in line with the first axis A. This is achieved by a first axis A (virtually) piercing respectively penetrating the reflection element 11 respectively be the arrangement of the bearings laterally outside of the reflection element 11.

FIG. 2 illustrates schematically a top view of a first embodiment of a reflection assembly 10 according to the present invention with an inventive bearing arrangement. The inventive reflection assembly 10 comprises a curved and concave reflection element 11 being a glass mirror 11 having a reflection side 22 for reflecting radiation emitted by a non-illustrated image generation unit of an also not-illustrated head-up display and a back side 23 for mounting the reflection element 11 via a support structure 16 and a carrier 17 (see FIGS. 3 to 7d) to a head-up display's housing.

This reflection element 11 is also pivotable around a first axis A which is also defined by the kinematic points K1 and K2 of two bearings 12A and 12B. However, in this case the two bearings 12A and 12B are arranged at the back side 23 of the reflection element 11 such that the first axis A is extending completely behind the back side 23 of the reflection element 11 according to the present invention, wherein the pivot axis A is preferably aligned within the same plane with a main axis of the reflection element 11, wherein said plane in particular is a horizontal plane.

This inventive arrangement with the bearings 12A and 12B at the back side 23 of the reflection element 11 such that the first axis A is extending completely behind the back side 23 of the reflection element 11 allows to provide a reflection device 100 respectively 200 (see FIGS. 3 to 9) with a smaller dimension in lateral direction requiring less package in a motor vehicle in this direction, in particular without or with almost no or with easy to deal with negative impact on the vibration behaviour.

Furthermore, a reflection device can be provided without the bearings 12A, 12B being visible in the optical chamber. Therefore, the optical chamber can spouse perfectly the mirror's 11 shape without discontinuity in its design or any local design-deviation.

With the arrangement of the first axis A completely on the back side of the reflection element, i.e. with a first axis A which does not (virtually) pierces or penetrates the reflection element 11, also a small lever respectively also a small offset Δ, from the center of gravity CG of the reflection element 11 to the first axis A, can be achieved. This is advantageous regarding the vibration behaviour of the reflection element and results in good vibration behaviour, too.

Figure 3:
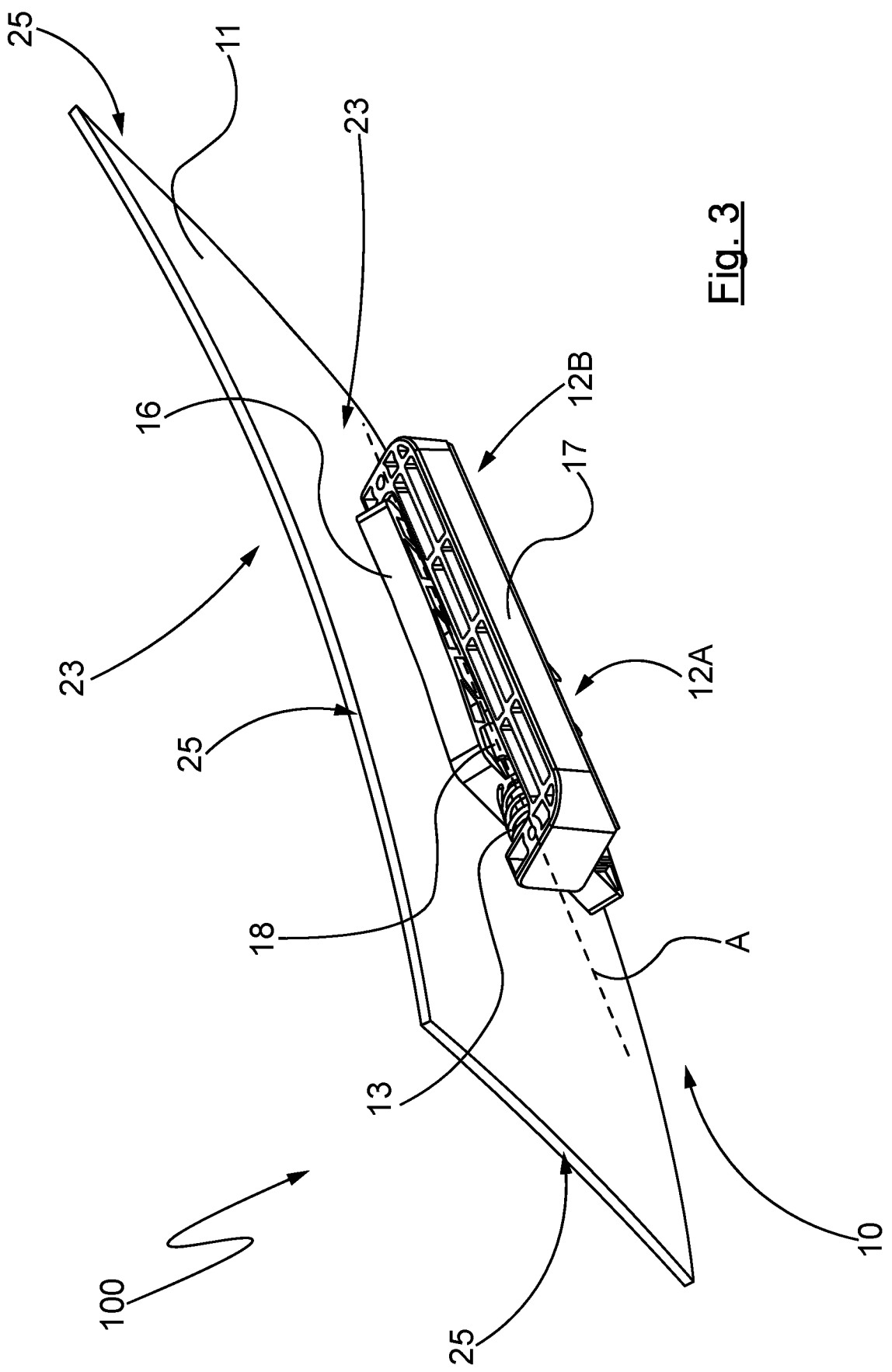
Figure 4:
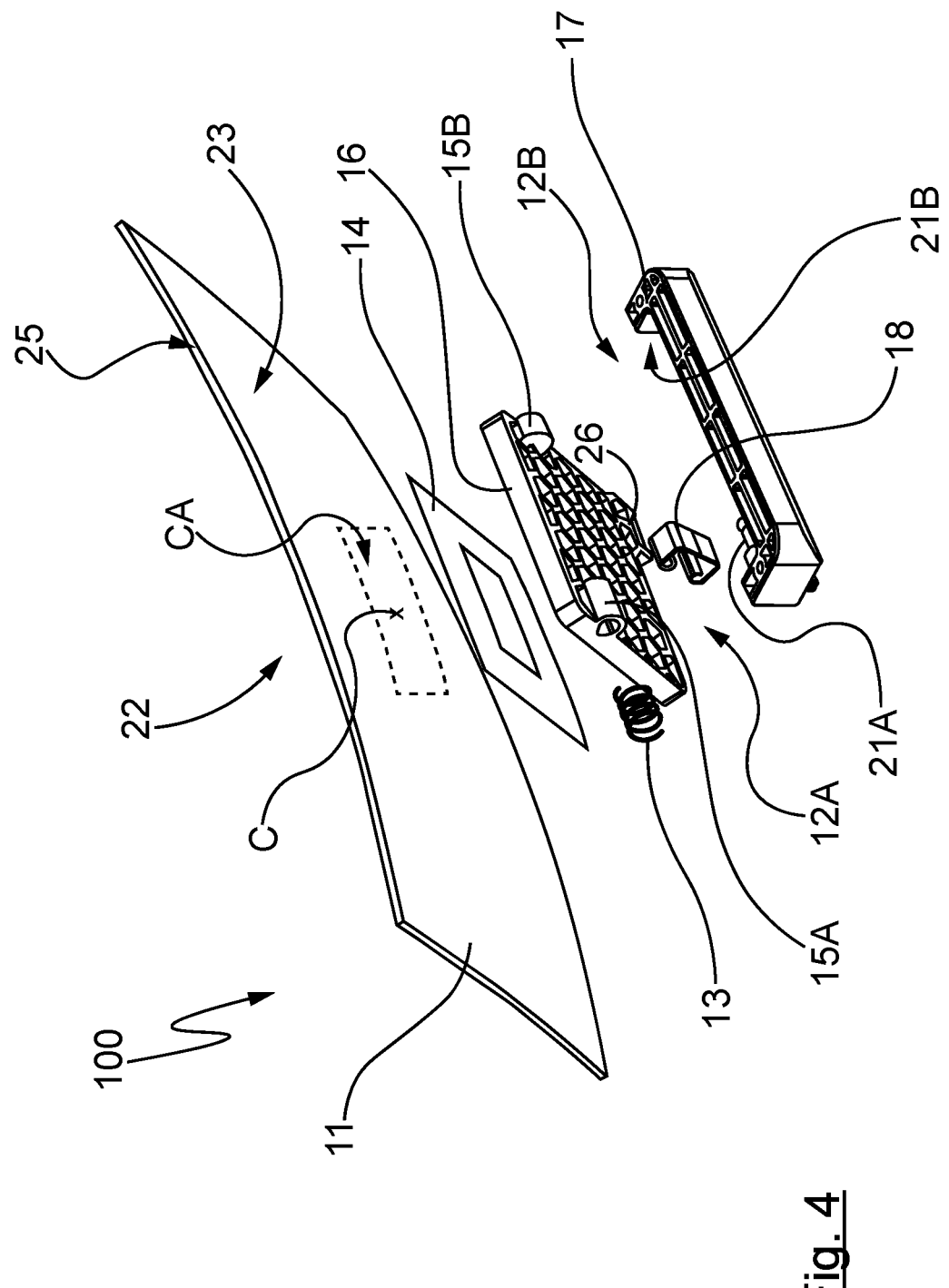
Figure 5:
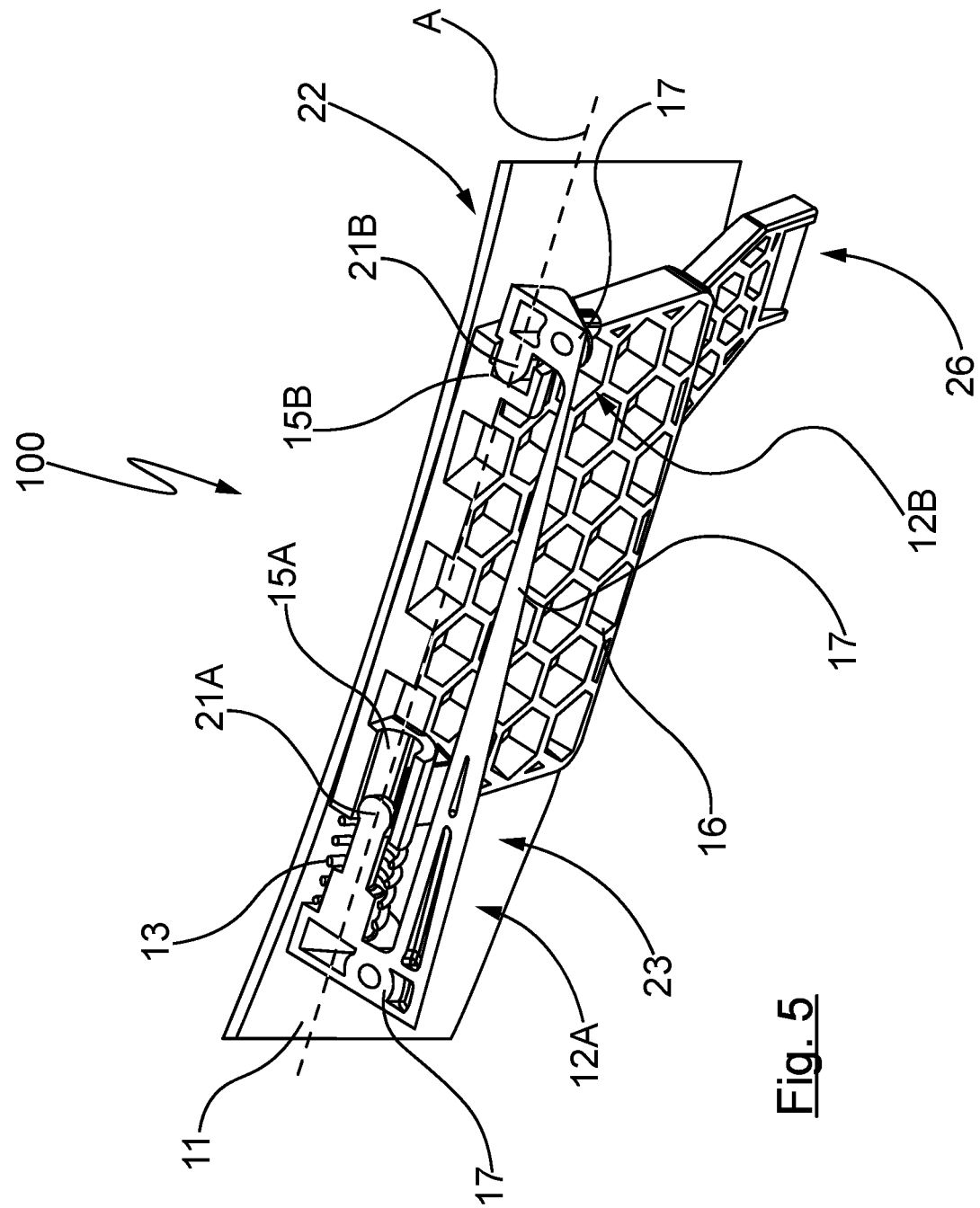
Figure 6:
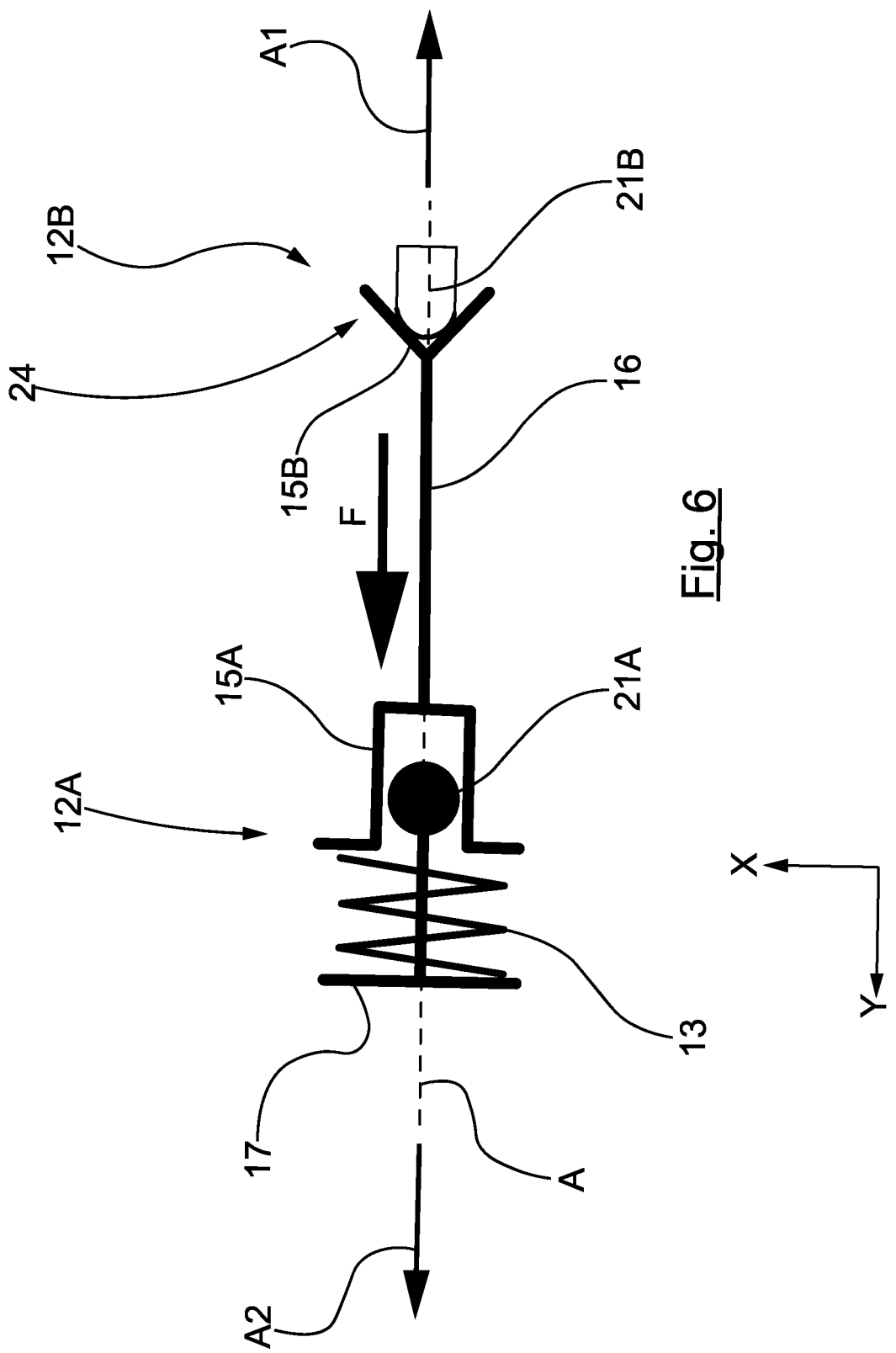
Figure 7C:
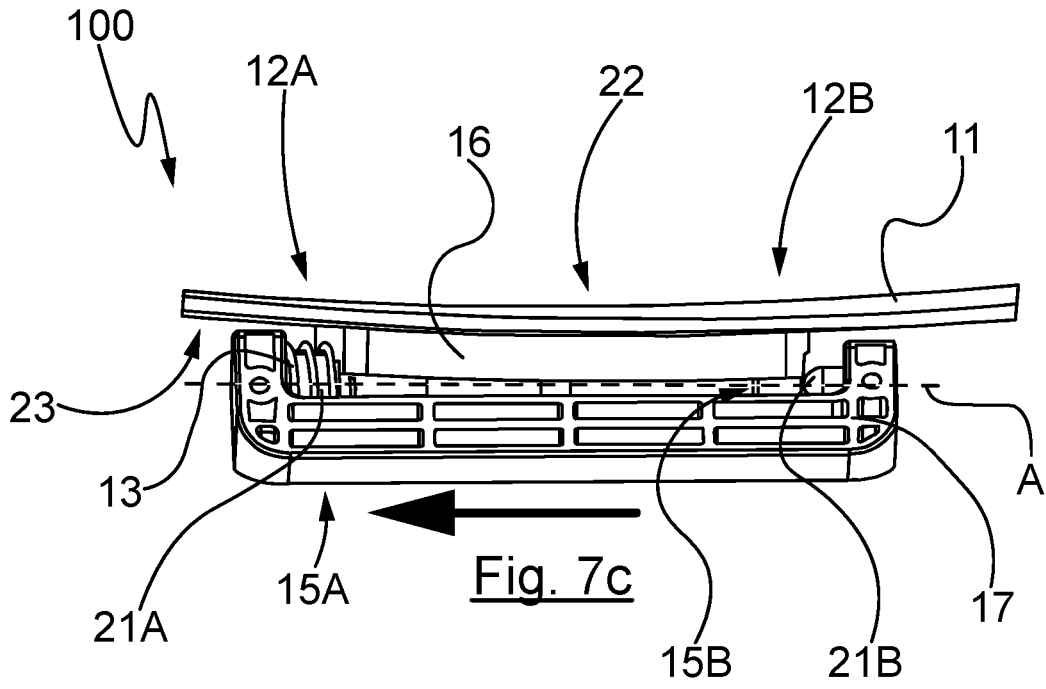
Figure 7D:
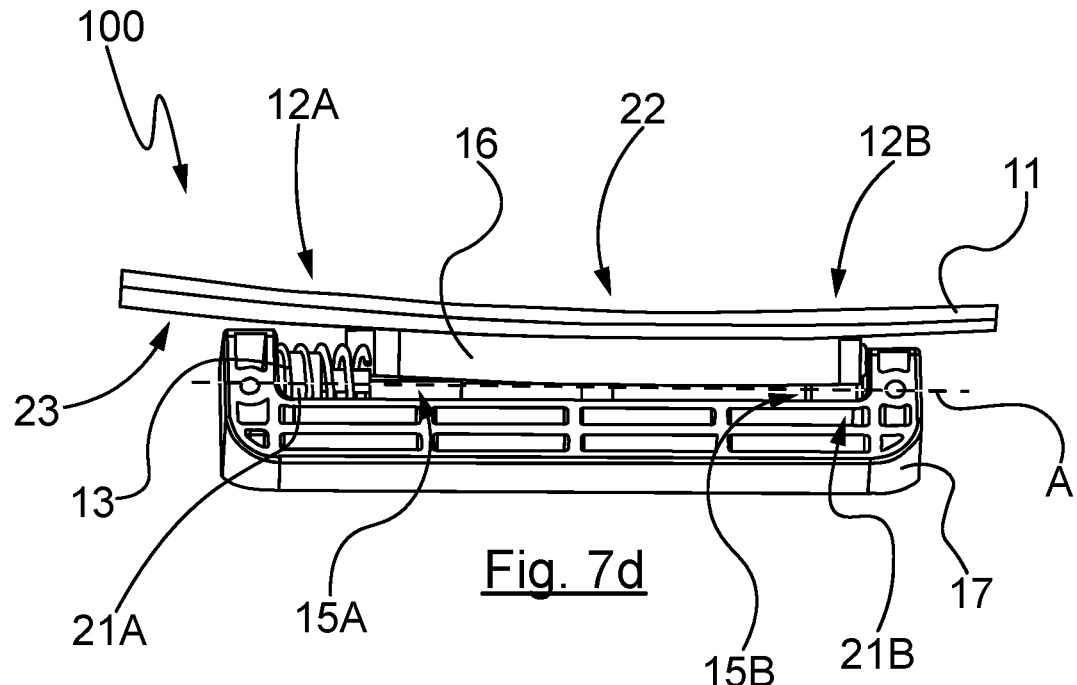

FIG. 3 shows a schematic illustration of a first embodiment of a reflection device according to the present invention in a perspective view, FIG. 4 an exploded view of the reflection device of FIG. 3, FIG. 5 a section view along the first axis of the reflection device of FIGS. 3 and 4, FIG. 6 a principle illustration of the bearing arrangement of the bearings of the reflection device of FIGS. 3 to 5 and FIGS. 7a to 7d some of the assembling steps to be processed for assembling the of the reflection device of FIGS. 3 to 6.

In the in FIGS. 3 to 7d presented embodiment of a reflection device 100 according to the present invention, the reflection element 11 is pivotable relatively to the carrier 17 about pivot axis A defined by kinematic points K1 and K2 of the two bearings 12A and 12B, wherein the bearing pivots 21A, 21B and the bearing receptacles 15A, 15B form sliding bearings 12A, 12B with kinematic points K1, K2.

The two bearings 12A and 12B are arranged at the back side 23 of the reflection element 11 such that kinematic points K1 and K2 of said bearings 12A and 12B each are located within the area of the back side 23 of the reflection element 11, wherein said area is surrounded by outer edge 25. In particular, said bearings 12A and 12B are arranged within a center area CA extending around a center point C (see FIG. 4).

Via said bearings 12A and 12B the reflection element 11 is movably coupled to a carrier 17 such that the reflection element 11 is pivotable relatively to the carrier 17 about the first axis A.

Each of said bearings 12A and 12B comprises at least two parts 15A and 21A respectively 15B and 21B in form of a bearing receptacle 15A, 15B and a corresponding bearing pivot 21A, 21B, wherein in the embodiments illustrated in the accompanying figures the bearing receptacles 15A and 15B are part of a support structure 16 made of a rigid plastic and having a honeycomb structure to minimize weight and to have an advantageous ratio of rigidity to weight. The bearing receptacles 15A and 15B are integrally moulded with that support structure 16 and thereby fixedly mounted to said support structure 16.

Figure 8:
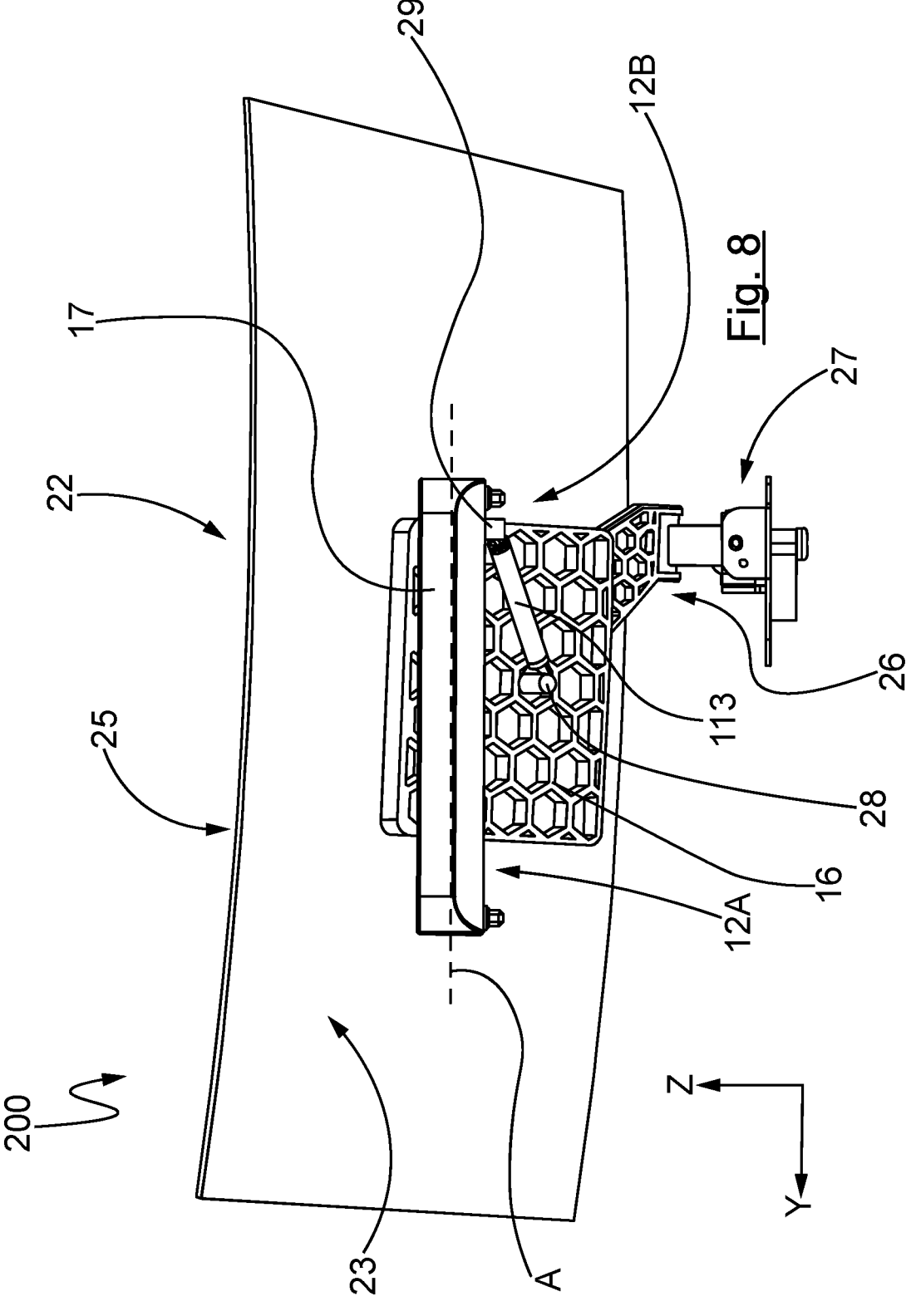
Figure 9:
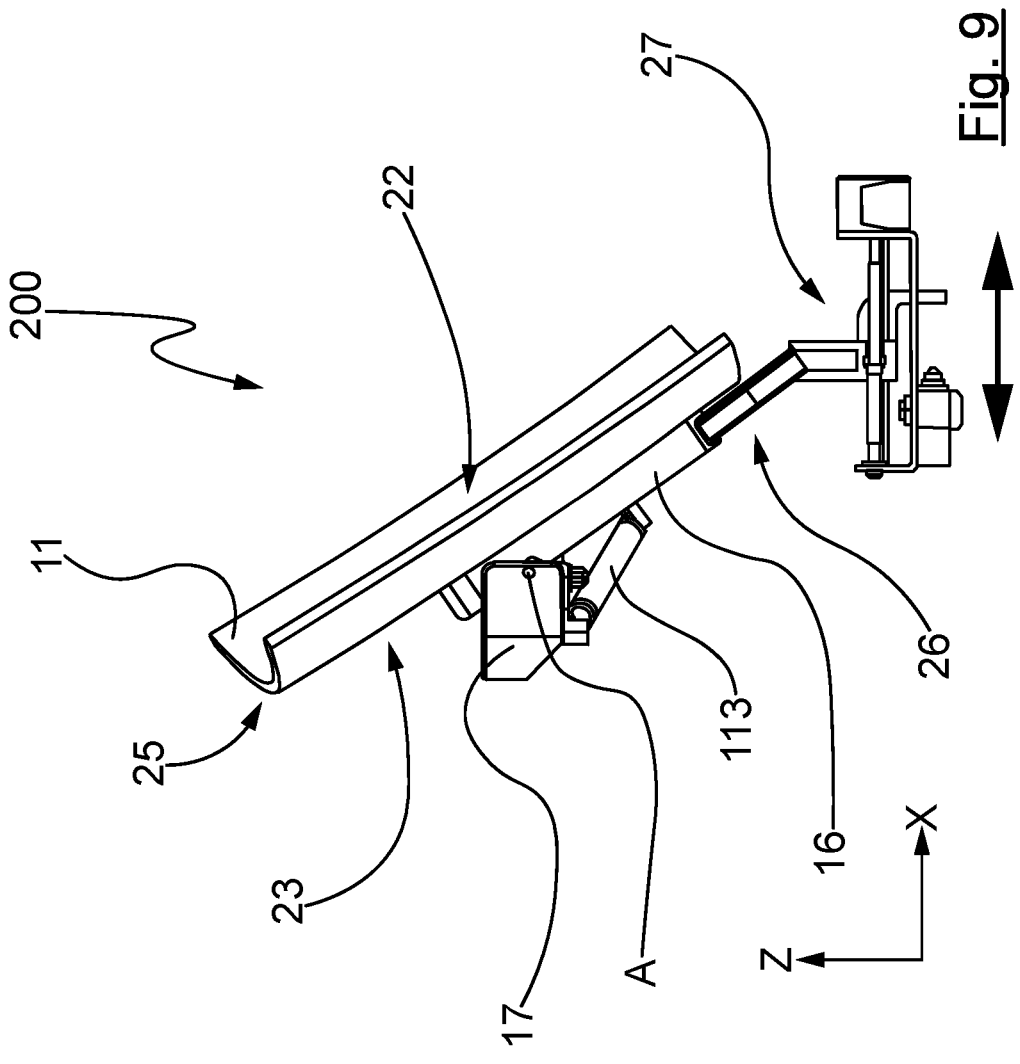

The support structure 16, which has a curvature corresponding to the back side 23 of the reflection element 11, is fastened to the back side 23 of the reflection element 11 by an adhesive tape 14 and further comprises coupling means 26 (see FIG. 5) for coupling the reflection device 100 with a linear pivot drive unit 27 similar as illustrated in FIGS. 8 and 9 for pivoting the reflection element 11 around the first axis A by actuation means (the linear pivot drive unit 27).

For an advantageous bonding behaviour, in particular to achieve high joint strength of the adhesive joints, the back side 23 is designed as a uniform or smooth surface without any protrusions or deepening. Of course, as preferred for adhesive joints, the surface may be pre-treated in the area of bonding, e.g. by roughening, cleansing, primarying, passivating and/or similar.

The reflection element 11 comprises no protrusion and or any deepening as well on its reflection side 22 as on its back side 23. Thereby, manufacturing of the reflection element 11 and fastening of the support structure 16 via an adhesive pad or tape 14 is relatively easy because no further steps for forming any protrusion and/or deepening is necessary.

The carrier 17 is couplable to a housing, preferably to a housing of a head-up display, or directly to a vehicle body.

For movable coupling of the reflection element 11 with the carrier 17 the bearing receptacles 15A and 15B are configured to be engaged with corresponding designed bearing pivots 21A and 21B fixedly mounted to the carrier 17, in particular integrally moulded with the carrier 17. The carrier 17 is also made of plastic in this embodiment.

The design of the bearings 12A and 12B is different, wherein the first and left bearing 12A comprises two degrees of freedom with respect to a translational movement in an axial direction along the first axis A (see FIG. 5) and enables relative movement between the bearing parts 15A and 21A of said bearing 12A in a first axial direction A1 along the first axis A and in a second axial direction A2 opposite to the first axial direction A1 as schematically illustrated in FIG. 5.

Contrary, the second and right bearing 12B comprises only one degree of freedom with respect to a translational movement in an axial direction along the first axis A and only enables relative movement between the bearing parts 15B and 21B of said bearing 12B in the first axial direction A1 along the first axis A, wherein an axial movement in the second axial direction A2 opposite to the first axial direction A1 is limited, preferably by an end stop 24 (see FIG. 5).

To achieve this, each of the bearings 12A, 12B comprise a bearing receptacle 15A, 15B which is designed, configured and aligned such that an assembly direction along which the bearing pivot 21A, 21B has at least partly to be inserted into the bearing receptacle 15A, 15B is extending at least substantially parallel or parallel to the first axis A of the reflection device 100.

Furthermore, the left bearing 12A comprises a bearing receptacle 15A which is at least substantially shaped as a hollow cylinder with an open top and a closed bottom (see FIG. 5). Right bearing 12B comprises a hollow cone-shaped bearing receptacle 15B with the cone tip forming a closed bottom of the receptacle 15B and facing away from the open end of the recess 15B (see FIG. 5).

As illustrated in FIG. 5, the left bearing 12A comprises a bearing pivot 21A having a ball sphere end as a bearing surface with which the bearing pivot 21A contacts a bearing surface or slides on a bearing surface of the bearing receptacle 15A. The right bearing 12B comprises a bearing pivot 21B in form of a cylindrical pin 21B having a hemispherical end, contacting the inclining surfaces of the hollow cone-shaped receptacle 15B via a circular contact line resulting in very low bearing friction due to the circular contact line having a smaller diameter as a sphere in a cylinder, as diameter equivalent to the one of the cylindrical pin 21B.

For reducing play in axial direction along the first axis A in the bearing arrangement, the reflection device 100 further comprises a coil spring 13 as 1D-biasing means 13 for generating a biasing force F in an axial direction along the first axis A in an assembled state of said reflection device 100. This spring 13 ensures that there is always contact between the bearing pivot 21B and the cone receptacle 15B meanwhile the ball sphere end of the other baring pivot 21A of the other bearing is just guided along the first axis A by the cylindrical receptacle 15A of bearing 12A. Thereby, the reflection element 11 can further be hold in position in axial direction along the first axis A after assembling of the reflection device 100.

For securing the coupling between the reflection element 11 and the carrier 17 the reflection device 100 further comprises a metal sheet as a securing element 18 (see e.g. FIG. 4), wherein this metal sheet element 18 in particular acts as clamp and compresses bearing receptacle 15A slightly.

Since the reflection element 11 shall not move along the first axis A, a second biasing element, in particular a second spring, can be required for a better guidance of the reflection element 11 respective for a more precise adjustment of the reflection element 11 in a head-up display's housing, in particular for removing plays in other direction(s) than along the first axis A,), for e.g. in X-direction, in particular for reducing or removing a play between the reflection element 11 and a pivot driving unit 27.

FIGS. 7a to 7d illustrate some of the assembling steps to be processed for assembling of the reflection device of FIGS. 3 to 6, wherein the figures show the ease of assembly. After assembling the coil spring 13 to the carrier 17, the carrier 17 can be assembled on the left side by inserting bearing pivot 21A into bearing receptacle 15A under an angle to the first axis A and by compressing spring 13. Because of the spherical outer surface of the bearing pivot 21A and the cylinder-shaped bearing receptacle 15A, the carrier 17, respectively the bearing pivot 21A inside the bearing receptacle 15A, can slide to the right in first axial direction A1. Afterwards the carrier 17 can be rotated or pivoted a bit in order to align the pin-shaped bearing pivot 21B with the hollow cone-shaped bearing receptacle 15B. Once the bearing pivot 21B and the bearing receptacle 15B are aligned, in particular in contact, pushing onto the carrier 17 and compressing spring 13 can be terminated. The spring 13 relaxes as far as possible resulting in bringing back the carrier 17 substantially in its previous position (see FIG. 7a) until bearing pivot 21B gets in contact with the cone surface of bearing receptacle 15B.

By choosing the right biasing element 13 a permanent pressurizing from bearing pivot 21B to the end stop 24 of bearing receptacle 15B can be achieved. Thereby, play in the corresponding bearing 12B can be reduced in axial direction of the first axis A and the reflection element 11 can be hold in a defined position in axial direction.

Instead of more than one 1 D-biasing element, a reflection device 100 according to the present invention might also comprise a 3D-biasing element or a biasing element being arranged over three dimension spatially.

FIG. 8 represents a perspective view of another embodiment of a reflection device 200 according to the present invention comprising a 3D-biasing element instead of a 1 D-biasing element. FIG. 9 shows a side view from the reflection device of FIG. 8.

In this embodiment 200, the compression spring 113 of the previous embodiment 100 is replaced by a tension spring 113 arranged spatial generating a spatial biasing force including force components of all directions X, Y and Z. This spring 113 is no longer orientated only along the Y-axis, rather it is oriented diagonally in the complete XYZ reference system. Thereby, plays in all spatial directions X, Y and Z can be reduced or eliminated.

In addition to the described and shown design examples, a number of other designs are possible without leaving the scope of protection defined by the patent claims.

REFERENCE CHARACTER LIST 1 embodiment of a prior-art reflection element assembly
10 embodiment of a reflection element assembly
100, 200 embodiment of a reflection device according to the present invention
11 reflection element
12A first (left) bearing
12B second (right) bearing
13, 113 biasing element
14 adhesive pad
15A, 15BA first (left) bearing receptacle
15A, 15BB second (right) bearing receptacle
16 support structure
17 carrier
18 securing element
21A, 21BA first (left) bearing pivot
21A, 21BB second (right) bearing pivot
22 reflection side of the reflection element
23 back side of the reflection element
24 end stop
25 outer edge of the reflection element
26 coupling means for coupling the support structure with a (linear) pivot drive unit
27 linear pivot drive unit
28, 29 connection means
A first axis/pivot axis
A1 first axial direction
A2 second axial direction
C center of the back side
CA center area of the back side
CG center of gravity of the reflection element
Δ Offset between center of gravity and first axis/pivot axis
F biasing force
K1, K2 kinematic points of the first and second bearings

The invention claimed is:

1. A reflection device for a head-up display for a windshield head-up display, for reflecting of radiation emitted by an image generation unit, wherein the reflection device comprises:

a reflection element having a reflection side and a back side being arranged on the side remote from the reflection side;

a carrier supporting the reflection element;

a first biasing means for generating at least a biasing force in an axial direction parallel or along the first axis in an assembled state of said reflection device for holding the reflection element in a defined position in axial direction along the first axis after assembling of the reflection device; and a second biasing means for generating a biasing force in an axial direction perpendicular to the first axis, wherein the reflection element is movably coupled to the carrier by at least one bearing such that the reflection element is pivotable relatively to the carrier about at least a first axis, wherein the carrier is couplable to a housing of a head-up display, or directly to a vehicle body, and wherein the at least one bearing is arranged at the back side of the reflection element such that the first axis is extending completely behind the back side of the reflection element, and wherein the at least one bearing part and a second bearing part are capable of moving in a direction that is along or parallel to the first axis.

2. The reflection device according to claim 1, wherein the reflection element is rotatably coupled to the carrier by at least two bearings comprising a first bearing and a second bearing arranged at the back side of the reflection element with each bearing having a kinematic point and the kinematic points of said bearings defining the first axis about which the reflection element is rotatable relatively to the carrier.

3. The reflection device according to claim 1, wherein at least one bearing comprises at least two parts a bearing pivot and a bearing receptacle for receiving said bearing pivot, wherein one of said parts, the bearing pivot or the bearing receptacle, is mounted fixedly to the reflection element and the other one, bearing receptacle or the bearing pivot, respectively, is mounted fixedly to the carrier.

4. The reflection device according to claim 3, wherein at least one bearing receptacle is fixedly mounted to the reflection element via a support structure.

5. The reflection device according to claim 2, wherein one of said two bearings comprises one degree of freedom with respect to a translation in an axial direction along the first axis and enables relative movement between the bearing parts in a first axial direction along the first axis, wherein an axial movement in a second axial direction opposite to the first axial direction is limited by an end stop.

6. The reflection device according to claim 2, wherein one of said two bearings comprises two degrees of freedom with respect to a translation in an axial direction along the first axis and enables relative movement between the bearing parts in a first axial direction along the first axis and in a second axial direction opposite to the first axial direction.

7. The reflection device according to claim 1, wherein at least one bearing comprises a bearing receptacle which is designed, configured and aligned such that an assembly direction along which the bearing pivot has at least partly to be inserted into the bearing receptacle is extending at least substantially parallel or parallel to the first axis of the reflection device.

8. The reflection device according to claim 3, wherein the reflection device comprises at least one securing element for securing the coupling between the reflection element and the carrier.

9. A reflection element assembly for a reflection device for a head-up display, comprising:
a reflection element having a reflection side and a back side being arranged on the side remote from the reflection side; and
at least one bearing part of an at least two-part bearing,
wherein the reflection element is pivotably couplable to a carrier by at least one bearing comprising at least two bearing parts such that the reflection element is pivotable relatively to the carrier about at least a first axis, wherein the carrier supports the reflection element and is couplable to a housing of a head-up display, or directly to a vehicle body,
wherein at least one bearing part of said at least one bearing is arranged at the back side of the reflection element and is configured such that in a state of use of the reflection assembly the first axis is extending completely behind the back side of the reflection element,
wherein the at least one bearing part and a second bearing part are capable of moving in a direction that is along or parallel to the first axis,
wherein the reflection element is held in a defined position in axial direction along the first axis after assembling of the reflection device by a biasing means that generates at least a biasing force in an axial direction parallel or along the first axis in an assembled state of said reflection device, and
wherein a second biasing means generates a biasing force in an axial direction perpendicular to the first axis.

10. A head-up display for a motor vehicle, comprising:
an image generation unit for emitting light beams to produce an image; and
at least one reflection device for reflecting the light beams emitted by the image generation unit,
wherein the reflection device configured according to claim 1.

11. A motor vehicle having a head-up display configured according to claim 10.

* * * * *